United States Patent
Wang

(10) Patent No.: US 11,190,647 B2
(45) Date of Patent: Nov. 30, 2021

(54) INFORMATION PROCESSING APPARATUS STOPPING POWER SUPPLY TO HARDWARE CONNECTED TO A SOCKET

(71) Applicant: CANON KABUSHIKI KAISHA, Tokyo (JP)

(72) Inventor: Xiaoli Wang, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/447,171

(22) Filed: Jun. 20, 2019

(65) Prior Publication Data
US 2020/0028975 A1  Jan. 23, 2020

(30) Foreign Application Priority Data

Jul. 18, 2018 (JP) .............................. JP2018-135220

(51) Int. Cl.
*H04N 1/00* (2006.01)
*H04N 1/32* (2006.01)
*H04N 1/327* (2006.01)

(52) U.S. Cl.
CPC ....... *H04N 1/0001* (2013.01); *H04N 1/00891* (2013.01); *H04N 1/32587* (2013.01); *H04N 1/32763* (2013.01); *H04N 1/00965* (2013.01); *H04N 2201/0094* (2013.01)

(58) Field of Classification Search
CPC ............. H04N 1/0001; H04N 1/32587; H04N 1/00891; H04N 1/00896; H04N 1/32763; H04N 1/00965; H04N 2201/0094
See application file for complete search history.

(56) References Cited

U.S. PATENT DOCUMENTS

| | | | |
|---|---|---|---|
| 8,544,093 B2 | 9/2013 | Unagami | |
| 2006/0050308 A1* | 3/2006 | Wakana | H04N 1/00127 358/1.15 |
| 2006/0246866 A1* | 11/2006 | Nakagawa | H04N 1/00281 455/301 |
| 2006/0271588 A1* | 11/2006 | Tanaka | G06F 16/58 |
| 2010/0309511 A1* | 12/2010 | Ito | H04N 1/32358 358/1.15 |
| 2011/0302448 A1* | 12/2011 | Okabe | G03G 15/5004 714/14 |

(Continued)

FOREIGN PATENT DOCUMENTS

| | | |
|---|---|---|
| JP | 5453324 | 1/2014 |
| WO | 2010/092832 | 8/2010 |

*Primary Examiner* — Juan M Guillermety
(74) *Attorney, Agent, or Firm* — Venable LLP

(57) ABSTRACT

The present invention provides an information processing apparatus capable of mounting an optional hardware. The information processing apparatus comprises a processor, an image processing circuit and a socket to which the optional hardware is to be mounted, wherein the optional hardware being connected to the socket communicates with the image processing circuit. The processor transmits a predetermined packet to the optional hardware mounted to the socket, receive a response packet to the predetermined packet from the image processing circuit, determines whether or not the received response packet is an expected response packet, and controls supplying power to the optional hardware in accordance with a determination result of the received response packet.

16 Claims, 7 Drawing Sheets

(56) References Cited

U.S. PATENT DOCUMENTS

2016/0080599 A1\* 3/2016 Sasadai .............. H04N 1/00891
                                                    358/1.13
2016/0212289 A1\* 7/2016 Tomi .................. H04N 1/00896
2019/0286602 A1\* 9/2019 Remis ................ G06F 9/44505

\* cited by examiner

INFORMATION PROCESSING APPARATUS STOPPING POWER SUPPLY TO HARDWARE CONNECTED TO A SOCKET

BACKGROUND OF THE INVENTION

Field of the Invention

The present invention relates to an information processing apparatus, and a method of controlling the information processing apparatus.

Description of the Related Art

An image forming apparatus is known in which a semiconductor for processing image data obtained from a scanner or an external device is mounted on a controller board. For the purpose of reducing the price of such image forming apparatuses, a component capable of achieving a function matching the model is allowed to be mounted without fixing a part of functions of the controller board instead of creating the controller board for each model of the image forming apparatuses. Thus, multiple types of image forming apparatuses can be supported with a controller board of a single type. Such a component capable of achieving a function matching the model is typically mounted to a socket on a controller board, but the component can be replaced also after shipment. For example, Japanese Patent No. 5453324 discloses a technique for identifying and disabling a false module operating on an information processing apparatus.

On the other hand, there is an attack that utilizes a socket on a controller board, and, for example, it is possible to easily analyze the behavior of a device by mounting a debug tool to a debug socket of the controller board. Also, internal signals of the controller board can be obtained via such a socket. Consequently, when such information acquisition is continuously obtained via the socket, the signal patterns in the controller board can be analyzed, and the analysis results can be used to fraudulently obtain information from the device, or to alter the information in the controller board. A fraudulent module is identified by detecting alterations made by the fraudulent module in Japanese Patent No. 5453324; however, a technique capable of more easily detecting fraudulent hardware (attacking hardware) has been demanded.

SUMMARY OF THE INVENTION

An aspect of the present invention is to eliminate the above-mentioned problem with conventional technology.

The feature of the present invention is to provide a technique of detecting attacking hardware and then suppressing the activation of the attacking hardware.

According to a first aspect of the present invention, there is provided an information processing apparatus capable of mounting an optional hardware, the information processing apparatus comprising: an image processing circuit; a socket to which the optional hardware is to be mounted, wherein the optional hardware being connected to the socket communicates with the image processing circuit; a memory that stores instructions; and a processor that executes the instructions stored in the memory to: transmit a predetermined packet to the optional hardware mounted to the socket; receive a response packet to the predetermined packet from the image processing circuit; determine whether or not the received response packet is an expected response packet; and control supplying power to the optional hardware in accordance with a determination result of the received response packet.

According to a second aspect of the present invention, there is provided a method of controlling an information processing apparatus including an image processing circuit and a socket capable of mounting an optional hardware, wherein the optional hardware being connected to the socket communicates with the image processing circuit, the method comprising: transmitting a predetermined packet to the optional hardware connected to the socket; receiving a response packet to the predetermined packet from the image processing circuit; determining whether or not the response packet is an expected response packet; and controlling supplying power to the optional hardware in accordance with a determination result.

According to a third aspect of the present invention, there is provided An information processing apparatus, comprising: an image processing circuit; a socket that is capable of connecting an optional hardware, wherein the optional hardware being connected to the socket communicates with the image processing circuit; and a processor, wherein the processor transmits a predetermined packet to the optional hardware being connected to the socket, upon receiving a response packet produced by the optional hardware and the image processing circuit by processing the predetermined packet, the processor determines whether or not the response packet is an expected response packet, and the processor controls supplying power to the optional hardware in accordance with a determination result of the response packet.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. An image forming apparatus that is an example of an information processing apparatus according to the present invention will now be described.

Figure 1:
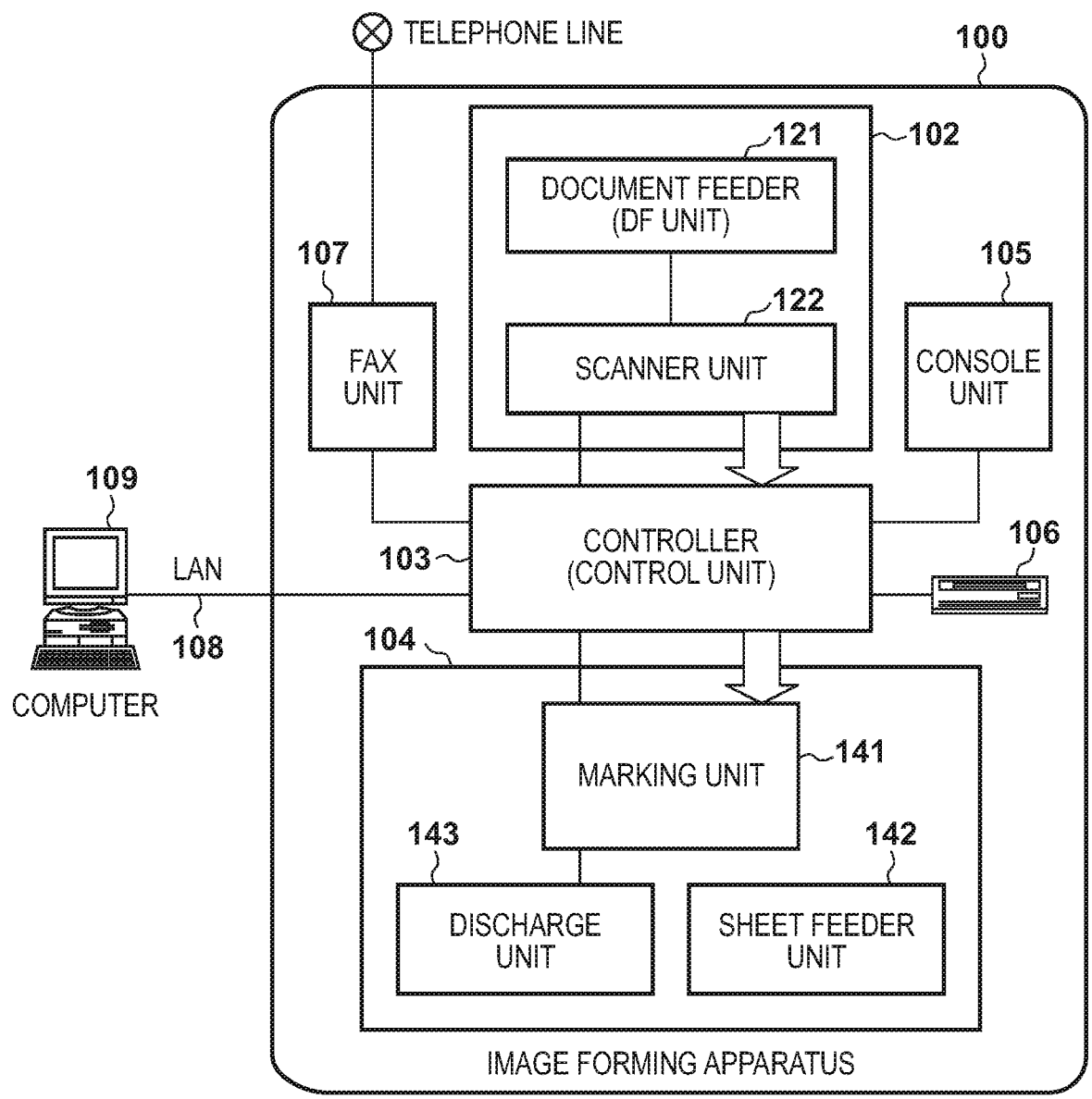
FIG. 1 is a block diagram for describing a hardware configuration of an image forming apparatus according to an embodiment.

FIG. 1 is a block diagram for describing a hardware configuration of an image forming apparatus 100 according to the embodiment.

A scanner 102 optically reads an image of an original document and converts the image into a digital image data. A printer unit 104 prints an image on a sheet based on digital image data. A console unit 105 includes a display unit that receives user operations and presents various information to the user, the display unit provides a user interface (UI). Note that the display unit may have a touch panel function. A hard disk drive (HDD) 106 stores various data such as image data, control programs, and the like. A fax unit 107 transmits and/or receives facsimile signals via a telephone line. A controller (control unit) 103 is connected with the above-mentioned components, and transmits and/or receives control signals and the like to/from the above-mentioned components to perform a job in the image forming apparatus 100. Also, the controller 103 can perform input/output of digital image data, issuing of a job, an instruction to devices and/or the like to/from a computer 109 via a LAN 108.

The scanner 102 includes a document feeder 121 on which to load an original document bundle and a scanner unit 122. The document feeder 121 can sequentially supply the documents to the scanner unit 122. The scanner unit 122 outputs, to the controller 103, digital image data obtained by scanning the original document.

The printer unit 104 includes a sheet feeder unit 142 capable of supplying sheets one by one from the loaded sheet bundle, a marking unit 141 that prints images on the supplied sheet, and a discharge unit 143 that discharges the printed sheet. The computer 109 provides an instruction to the controller 103 via the LAN 108 to cause the controller 103 to perform a job.

The image forming apparatus 100 is capable of performing a wide variety of jobs. Exemplary jobs are as follows.

Copy Function

Image data obtained from the scanner 102 is recorded in an HDD 106 and printing is performed using the printer unit 104.

Image Sending Function

Image data obtained from the scanner 102 is transmitted to the computer 109 via the LAN 108.

Image Storing Function

Image data obtained from the scanner 102 is recorded in the HDD 106 and image transmission and/or image printing is performed as necessary.

Image Print Function

For example, a page description language transmitted from the computer 109 is analyzed and printed in the printer unit 104.

Figure 2:
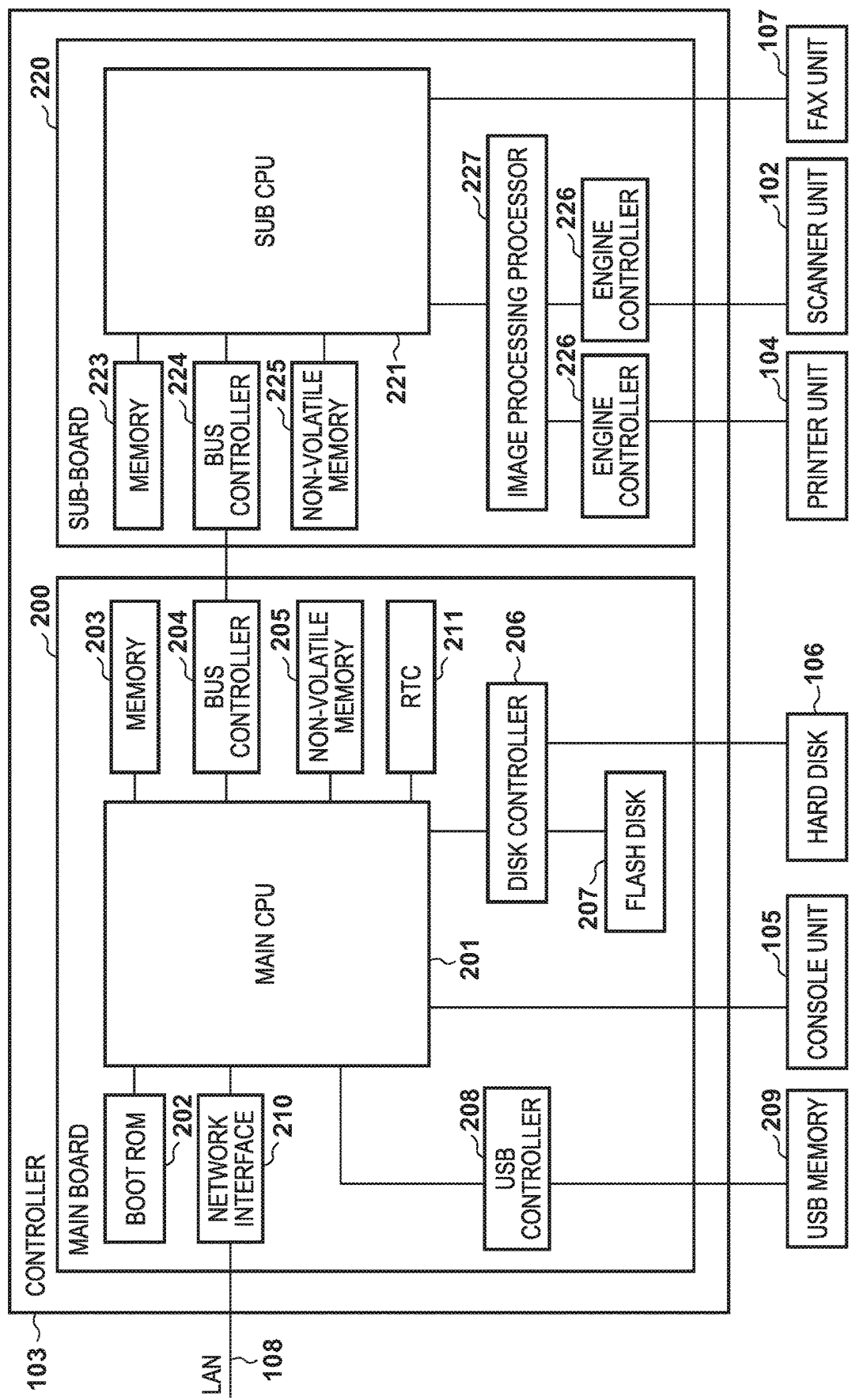
FIG. 2 is a block diagram for describing a hardware configuration of a control unit according to the embodiment.

FIG. 2 is a block diagram for describing a hardware configuration of the controller 103 according to the embodiment.

The controller 103 includes a main board 200 and a sub-board 220. The main board 200 is a so-called general-purpose CPU system including a main CPU 201 that controls the entire board, a boot ROM 202 including a boot program, and a memory 203 that serves as a work memory used by the CPU 201. Further, the main board 200 includes a bus controller 204 having a bridge function with an external bus, a non-volatile memory 205 in which the stored data is not lost even when the power source is turned off, and an RTC 211 having a clock function. In addition, there is provided a disk controller 206 that controls access to the HDD 106, a flash disk (such as an SSD) 207 that is a relatively small volume non-volatile storage device composed of a semiconductor device, and a USB controller 208 capable of controlling a USB. The USB memory 209, the console unit 105, the HDD 106, and the like are connected to the main board 200.

The sub-board 220 includes a relatively small general-purpose sub-CPU system and an image processing hardware. The sub-board 220 includes a sub-CPU 221 that controls the entire board, a memory 223 that serves as a work memory used by the CPU 221, a bus controller 224 having a bridge function with an external bus, and a non-volatile memory 225 in which the stored data is not lost even when the power source is turned off. The sub-board 220 further includes an image processing processor 227 that performs real-time digital image processing and an engine controller 226. The scanner 102 and the printer unit 104 exchanges digital image data via the engine controller 226. The sub-CPU 221 directly controls the FAX unit 107. Note that this drawing is a block diagram, and is simplified. For example, the main CPU 201, the sub-CPU 221, and the like include many pieces of CPU peripheral hardware such as a chip set, a bus bridge and a clock generator, but they are simplified in the drawing, and the present invention is not limited to this block configuration.

Next, the operation of the controller 103 is described with an exemplary copying of original documents.

When the user instructs to copy an original document from the console unit 105, the main CPU 201 sends a read command of the original document to the scanner 102 via the sub-CPU 221. The scanner 102 then optically scans the original document to obtain the digital image data corresponding to the image of the original document, and inputs the image data to the image processing processor 227 via the engine controller 226. The image processing processor 227 temporarily stores the digital image data in the memory 223 by DMA transfer. When confirming that all or a certain amount of the digital image data is stored in the memory 223, the main CPU 201 outputs a print instruction to the printer unit 104 via the sub-CPU 221. At this time, the sub-CPU 221 passes a read address of the image data of the memory 223 to the image processing processor 227. As a result, the image processing processor 227 outputs the image data of the memory 223 to the printer unit 104 via the engine controller 226 in synchronization with a synchronization signal from the printer unit 104. Thus, the printer unit 104 prints an image based on the image data of the original document.

When performing copying on multiple sheets, the main CPU 201 can store the image data of the memory 223 in the HDD 106, and copying of the image data on the second and succeeding sheets can be performed by the printer unit 104 without receiving the image data from the scanner 102.

Figure 3A:
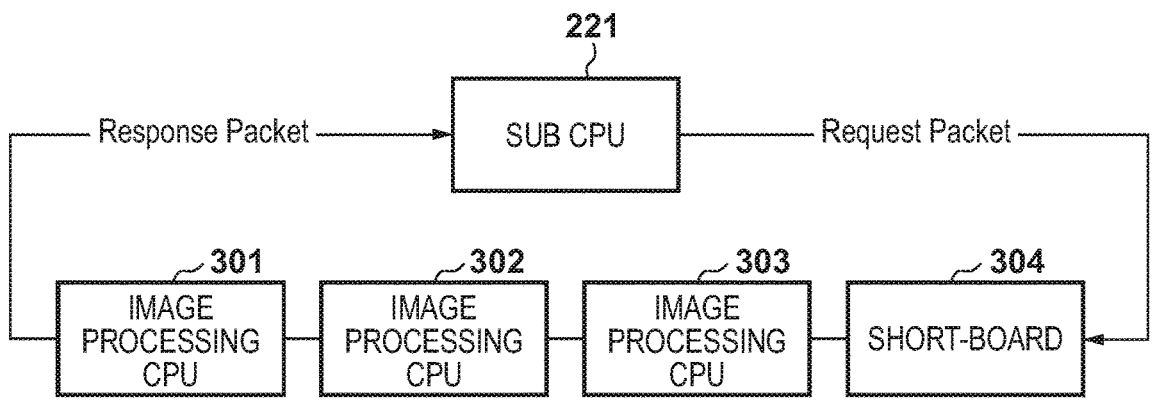
FIGS. 3A and 3B are block diagrams for describing image processing by a sub-CPU and image processing CPUs in a sub-board according to the embodiment.
Figure 3B:
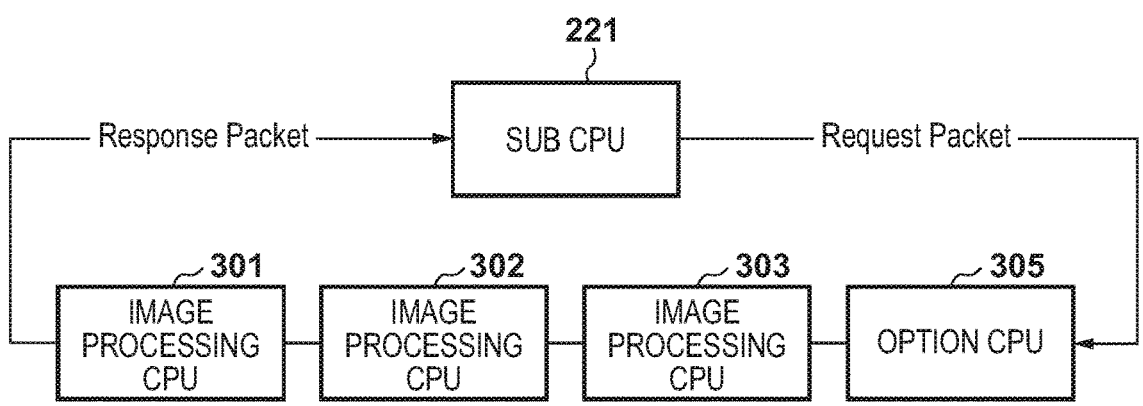

FIGS. 3A and 3B are block diagrams for describing image processing performed by the sub-CPU 221 and the image processing processor 227 in the sub-board 220 according to the embodiment.

For the sub-CPU 221 responsible for the image processing, an image processing CPU 301, an image processing CPU (image processing circuit) 302, an image processing CPU 303, and a short board 304 or an option CPU 305 required for an image formation operation are connected in series via an image processing bus.

As described in the description of the related art, image forming apparatuses of a plurality of types can be supported with a controller board of a single type for the purpose of cost reduction. For example, the short board 304 (through which electric signals pass without change) is provided to the sub-board 220 in the embodiment as illustrated in FIG. 3A. Thus, by implementing an option CPU 305 (capable of performing an additional function) as illustrated in FIG. 3B in place of the short board 304 in order to support a certain model, the function corresponding to the model can be achieved.

Each of the image processing CPUs 301 to 303 and the option CPU 305 incorporate an image memory for storing temporary data. The image processing CPUs 301 to 303 may be implemented by an application specific integrated circuit (ASIC). Note that the memory 223, the bus controller 224, the non-volatile memory 225, the engine controller 226 and the like in the sub-board 220 are not related with the present disclosure, and therefore are omitted in FIGS. 3A and 3B. The above-mentioned configurations are merely a part of modes for implementation of the present disclosure, and the actual product is not limited to the above embodiments.

In the image processing block of the sub-board 220 illustrated in FIGS. 3A and 3B, when the sub-CPU 221 receives an instruction from the main CPU 201, each image processing CPU on the image processing bus is controlled. Here, the sub-CPU 221 transmits a request packet to the short board 304 via the image processing bus. The request packet describes a destination specifying an image processing CPU. For example, the sub-CPU 221 may transmit a request packet describing a destination specifying the image processing CPU 301 to request an initialization process or an inversion processing on the print data that is currently present on the image memory. Each image processing CPU that has received the request packet analyzes the packet and performs a process corresponding to the instruction of the packet when the packet is recognized to be addressed for itself. Then, a response packet is transmitted to the sub-CPU 221 via the image processing bus. For example, upon receiving a request packet addressed for itself, the image processing CPU 301 performs initialization, inversion processing of the indicated image data and the like, and returns a response packet to the sub-CPU 221.

Further, in accordance with a determination that the request packet is not addressed to itself as a result of analysis of the request packet, each image processing CPU directly transmits the request packet to the image processing bus as it is without change. This allows, in the later stages, the image processing CPUs to receive the request packet and then perform an analysis and a process on the request packet.

In this manner, the sub-CPU 221 transmits the request packet via the image processing bus, and the image processing CPU indicated by the request packet returns the response packet, thereby completing through the communication. In the image forming apparatus 100, in order to perform a single job (e.g., copying), the sub-CPU 221 communicates multiple times with each image processing CPU as described above.

Figure 4:
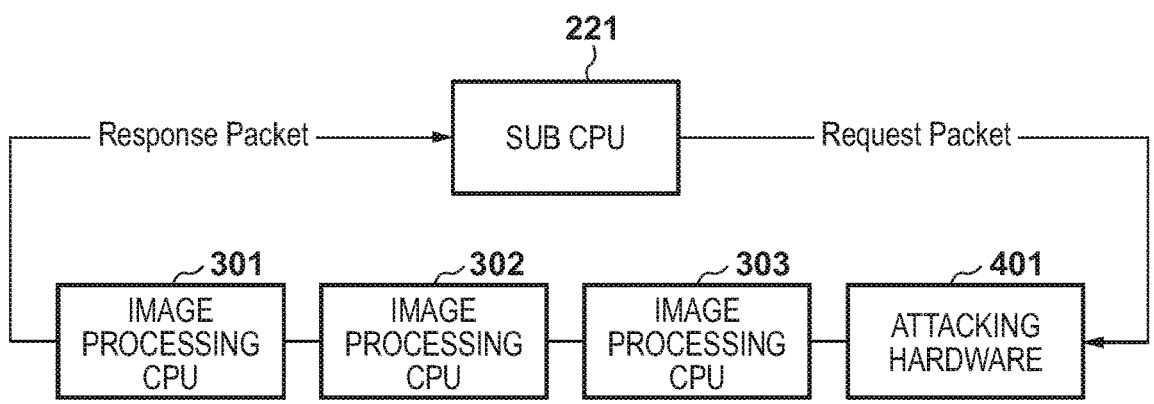
FIG. 4 is a diagram illustrating an example of a typical attack on the image forming apparatus.

FIG. 4 is a diagram for describing an example of a typical attack on the image forming apparatus 100. Note that, in FIG. 4, the components identical to those of FIGS. 3A and 3B are denoted with the same reference numerals.

As described above, the sub-CPU 221 controls each image processing CPU by using the packet via the image processing bus. Further, the existing short board 304 can be removed and the option CPU 305 can be mounted instead (see FIG. 3B). Utilizing such a configuration, an attacker can attack the system by mounting attacking hardware 401 in place of the short board 304 as shown in FIG. 4. For example, the attacking hardware 401 can fraudulently obtain various information by intercepting information flowing on the image processing bus and by storing the information in an external device. It is also conceivable to break and stop the control sequence of the system by altering and then transmitting the packet flowing on the image processing bus.

In the product on the market, such controller board is incorporated. Accordingly, such attacks can be executed by removing a cover of the product to mount the attacking hardware 401 to the socket of the controller board.

Figure 5:
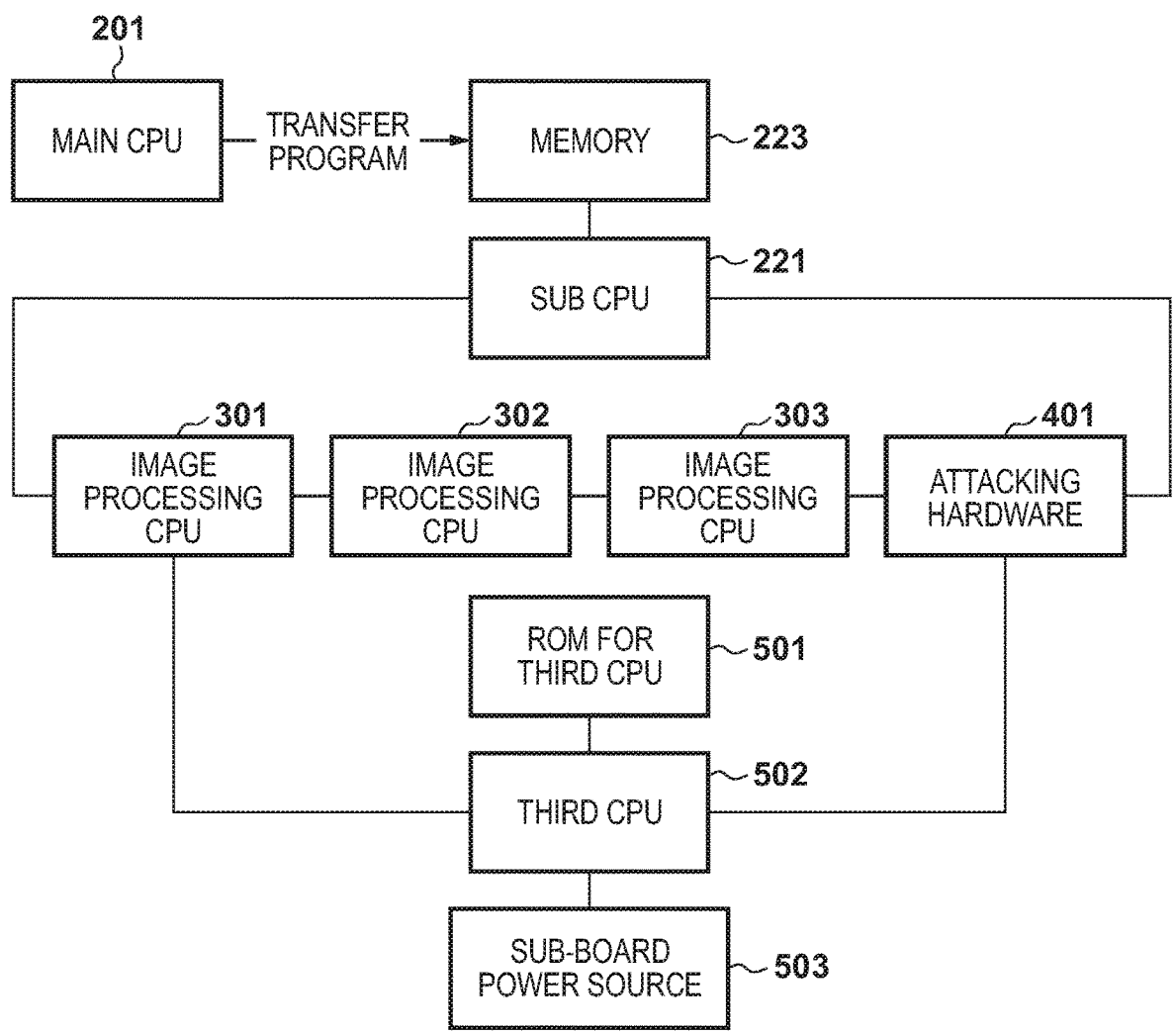
FIG. 5 is a block diagram for describing a configuration for detecting an attacking hardware in the image forming apparatus according to the embodiment.

FIG. 5 is a block diagram for describing a configuration for detecting the attacking hardware 401 in the image forming apparatus 100 according to the embodiment.

The main CPU 201 transfers the program for the sub-CPU 221 to the memory 223. The sub-CPU 221 operates in accordance with the program stored in the memory 223. Further, here, a third CPU 502 capable of accessing the image processing bus in the same manner as the sub-CPU 221, in additions to the main CPU 201 and the sub-CPU 221, is provided. The third CPU 502 operates in accordance with a program for the third CPU stored in a ROM 501 for the third CPU. The third CPU 502 is capable of controlling on/off of a sub-board power source 503.

FIGS. 6A, 6B, 7A and 7B are diagrams for describing a method for detecting attacking hardware in the image forming apparatus 100 according to the embodiment.

As described above, the third CPU 502 operates in accordance with the program stored in the ROM 501 for the third CPU. As with the sub-CPU 221, the third CPU 502 is capable of accessing the image processing bus, and is also capable of controlling the sub-board power source 503. Further, at the time of initialization of the image forming apparatus 100, the third CPU 502 transmits a request packet to each image processing CPU, and receives a response packet from each image processing CPU.

Figure 6A:
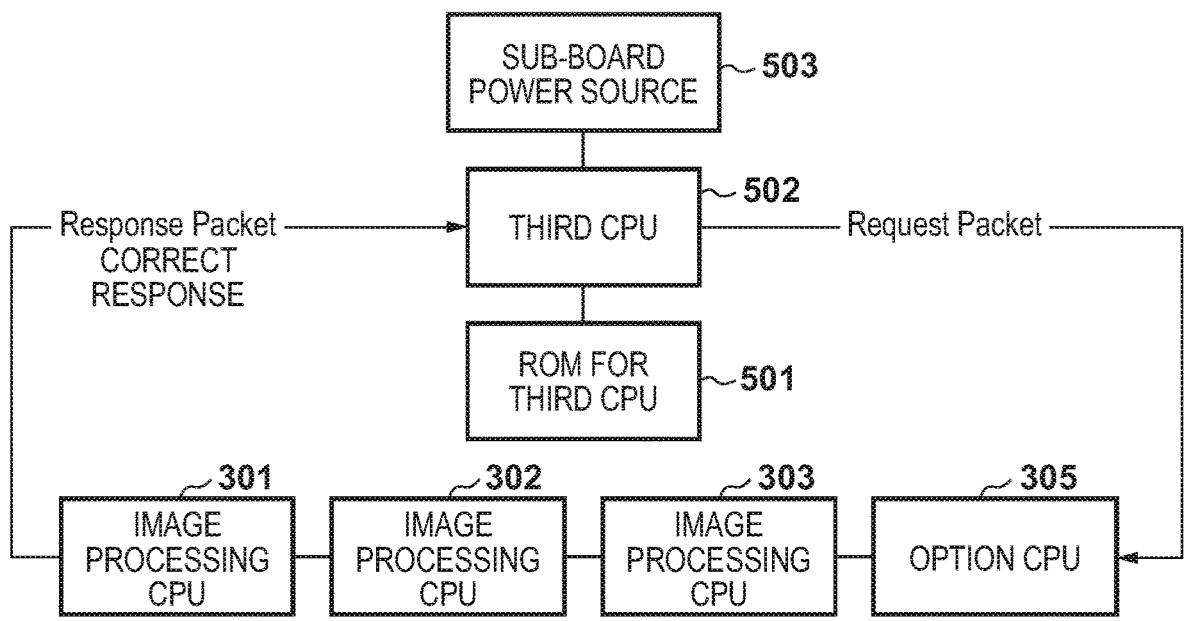
FIGS. 6A and 6B are diagrams for describing a method for detecting the attacking hardware in the image forming apparatus according to the embodiment.
Figure 6B:
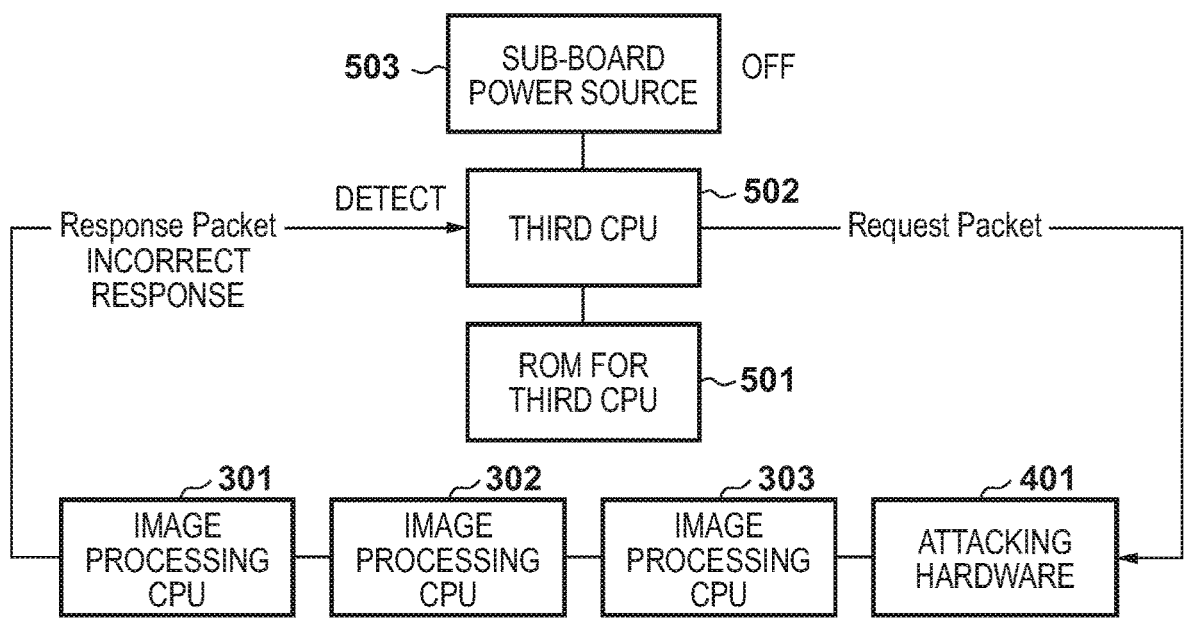

FIG. 6A depicts a view illustrating a state where the option CPU 305 is additionally provided as in FIG. 3B, and FIG. 6B depicts a view illustrating a state where the attacking hardware 401 is mounted in place of the short board 304 as in FIG. 4.

Figure 7A:
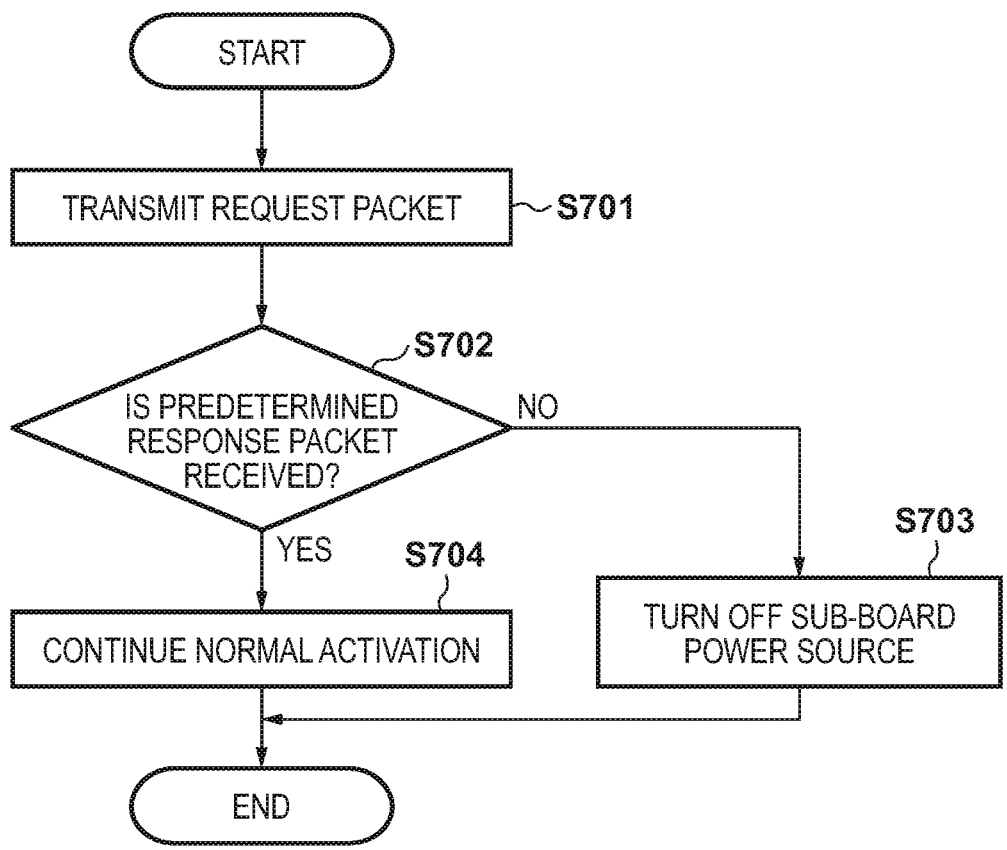
FIGS. 7A and 7B are diagrams for describing a method for detecting the attacking hardware in the image forming apparatus according to the embodiment.

FIG. 7A is a flowchart for describing a method for detecting attacking hardware in the image forming apparatus 100 according to the embodiment.

First, in step S701, to confirm whether the option CPU 305 is mounted or, depending on the models, whether the short board 304 is mounted, the third CPU 502 transmits the request packet via the image processing bus to a side of the short board 304. Then, if the option CPU 305 is mounted at the place of the short board 304, the third CPU 502 can receive a predetermined packet including a predetermined characteristic value, for example, from the whole image processing CPU. Accordingly, in this case, the third CPU 502 quits the control to the image processing bus, and the sub-CPU 221 performs initialization.

Next, the process proceeds to step S702, and the third CPU 502 determines whether or not the predetermined response packet has been received. At this time, if the attacking hardware 401 is mounted on the short-board 304 for example, the attacking hardware 401 cannot return the response packet unlike the option CPU 305. Accordingly, the third CPU 502 cannot receive the predetermined response packet, and therefore the process proceeds to step S703. In step S703, the third CPU 502 can stop the activation of the sub-board 220 by shutting off the power supply from the sub-board power source 503.

On the other hand, if the third CPU 502 receives the predetermined response packet in step S702, the process proceeds to step S704, and the third CPU 502 continues processing to perform the activation process of the sub-board 220 by turning on the power supply from the sub-board power source 503.

Figure 7B:
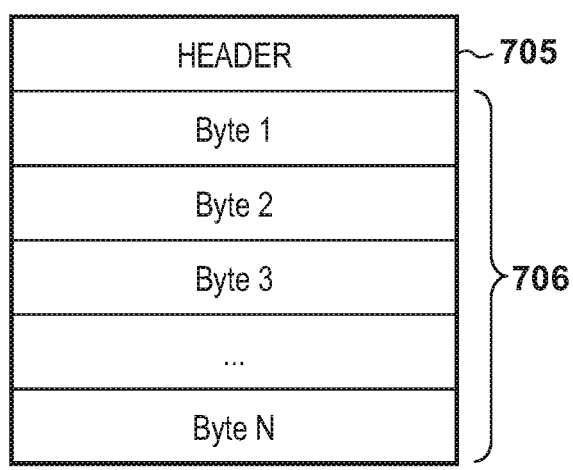

FIG. 7B is a diagram for describing an example of a packet format used in communication between the CPUs described above.

This packet includes a header 705 and a body 706. The header 705 describes destination device numbers, packet sizes, and the like. Responses from the image processing CPUs are contained in Byte1 to ByteN of the body 706. The third CPU 502 analyzes the packet and determines whether or not predetermined information is contained.

In this manner, the activation of the sub-board 220 is stopped if the attacking hardware is mounted, and thus attacks by the attacking hardware can be prevented. Since the sub-board 220 is not activated when the attacking hardware is mounted as described above, job-related request packets are not transmitted from the sub-CPU 221 when the attacking hardware is mounted, and therefore the information is not intercepted or altered.

The request packet transmitted by the third CPU 502 and the response packet information transmitted by each image processing CPU and the option CPU 305 are stored in the memory (not illustrated) of the third CPU 502.

Figure 8:
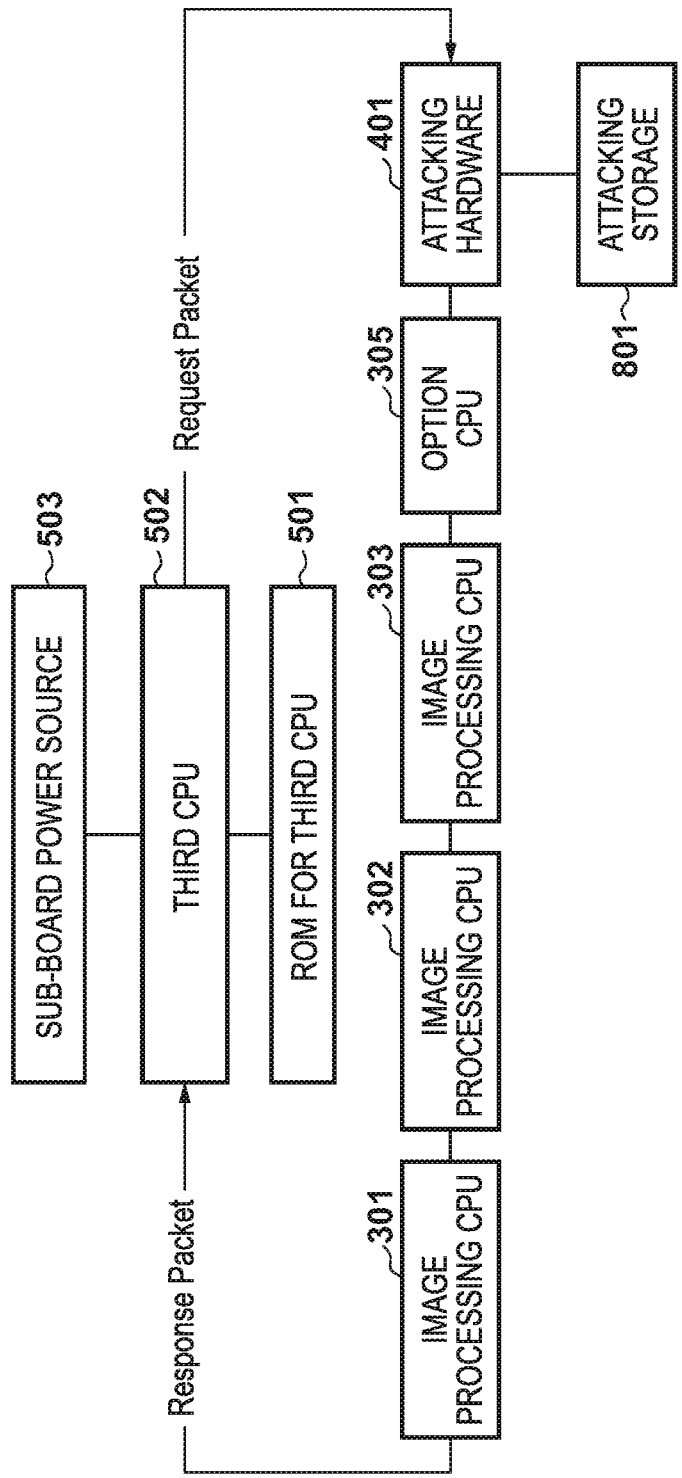
FIG. 8 is a diagram for describing an example of a countermeasure against an attack of a communication detection device (of a so-called sniffer type).

FIG. 8 is a diagram for describing an exemplary embodiment for a countermeasure against an attack of a communication detection device (of so-called sniffer type).

While FIGS. 5 to 7A illustrate examples of detection of the attacking hardware in the case where the option CPU 305 is removed and then the attacking hardware 401 is mounted instead, FIG. 8 depicts a view illustrating an attack of another type and the countermeasures against such an attack.

As illustrated in FIG. 8, the option CPU 305 is connected with the image processing bus via the attacking hardware 401 (e.g., via a conversion cable). The attacking hardware 401 connects an attacking storage 801 and can store information in the attacking storage 801. Here, the attacking hardware 401 transmits, directly to the next option CPU 305, the request packet flowing on the image processing bus. At this time, the response packet that the third CPU 502 receives is the same as in a normal case (a case where no attacking hardware is present), and consequently the third CPU 502 cannot detect the attacking hardware 401. The attacking hardware 401 can store the obtained communication packets in the attacking storage 801 and can identify the communication protocol (types of packets and timings in transmission and/or reception) of the image processing bus by analyzing the obtained communication packets. On the basis of the analyzed information, it is possible to create attacking hardware capable of transmitting and/or receiving the same packet as that of the option CPU 305 and extract data using the created attacking hardware without being detected.

As a counter measure against such a communication detection function, the third CPU 502 generates a request packet including encrypted additional information based on the date, time, model, serial number of the machine and the like, and then transmits the generated request packet to each image processing CPU. Each image processing CPU having received the request packet including the additional information analyzes the received packet and then generates a response packet including individual additional information to transmit it to the third CPU 502.

For example, when the date and time of the transmission is "10:59, Aug. 9, 2017" and the model number is "001", the following request packet is transmitted.

"1108-0908-9941-001"+(conventional request packet)

Here, "1108" is a character string obtained from the year "2017" by subtracting 1 from each even-numbered digit and by adding 1 to each odd-numbered digit. "0908" is a character string obtained by reversing the month and date "0809". "8941" is a complement of the transmission time "1059". Further, "001" is the model number "001" itself.

Each image processing CPU having received the request packet analyzes the received request packet, and then decrypts it to the original "2017-0809-1059" to transmits it in addition to the response packet.

On the other hand, the attacking hardware 401 does not know the creation logic of such a response packet, and therefore cannot generate the above-mentioned response packet including the additional information for the request packet.

When receiving a correct response packet, the third CPU 502 continues the activation of the sub-board 220. When the correct response packet cannot be received, it is determined that the attacking hardware 401 is connected, and then the activation of the sub-board 220 is stopped by shutting off the power supply from the sub-board the power source 503. In this manner, the addition of additional information to the request packet can significantly increase the difficulty of the communication analysis by the attacker and can protect it from the attack of the attacking hardware. Note that the addition of information is merely an example, and the present invention is not limited to this example.

As described above, according to the embodiments, even when a fraudulent attacking hardware is connected as an option, the activation of the hardware can be prevented.

Additionally, in the embodiment, when attacking hardware is mounted, the control board connecting it is not activated, thus providing an effect that the information is not intercepted or altered by the attacking hardware.

Also, for example, even when the information is intercepted by the attacking hardware, the information may not be used for other models since the information contains at least the model number. Thus, it is possible to prevent spread of the damage due to the fraudulent module based on information obtained by the attacking hardware.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-135220, filed Jul. 18, 2018, which is hereby incorporated by reference herein in its entirety.

What is claimed is:

1. An information processing apparatus capable connecting a hardware, the information processing apparatus comprising:
a plurality of processing circuits or processors;
a socket to which the hardware is to be connected, wherein the hardware being connected to the socket and the plurality of processing circuits or processors are connected in series via a bus;
a power source that supplies power to the plurality of processing circuits or processors and the hardware being connected to the socket,
wherein one of the plurality of processing circuits or processors:
transmit a predetermined packet to the bus;
receive a response packet to the predetermined packet;
determine whether or not the received response packet is an expected response packet; and
control stopping power supply from the power source to the hardware being connected to the socket and the plurality of processing circuits or processors connected via the bus based on a determination result of the received response packet,
wherein the predetermined packet includes additional information encrypted on a basis of a date and time and model information of the information processing apparatus, and the expected response packet includes information obtained by decrypting the additional information.

2. The information processing apparatus according to claim 1, wherein the response packet is produced by the hardware being connected to the socket.

3. The information processing apparatus according to claim 1, wherein the power source is controlled by the one of the plurality of processing circuits or processor.

4. The information processing apparatus according to claim 1, wherein the one of the plurality of processing circuits or processors controls the power source to stop supplying the power to the hardware being connected to the socket and the plurality of processing circuits or processors connected via the bus in a case where the received response packet is not the expected packet.

5. The information processing apparatus according to claim 1, wherein
the predetermined packet includes a destination for specifying the hardware being connected to the socket and the plurality of processing circuits or processors, and one of the hardware being connected to the socket and the plurality of processing circuits or processors performs processing on a packet that is addressed to the one of the hardware being connected to the socket and the plurality of processing circuits or processors.

6. The information processing apparatus according to claim 1, wherein the plurality of processing circuits or processors include an application specific integrated circuit (ASIC).

7. A method of controlling an information processing apparatus including a plurality of processing circuits or processors, and a socket to which a hardware is to be connected, wherein the hardware being connected to the socket and the plurality of processing circuits or processors are connected in series via a bus, and a power source that supplied power to the plurality of processing circuits or processors and the hardware being connected to the socket, the method comprising:
one of the plurality of processing circuits or processors performs:
transmitting a predetermined packet to the bus;
receiving a response packet to the predetermined packet;
determining whether or not the response packet is an expected response packet; and
controlling supplying power from the power source to the hardware being connected to the socket and the plurality of processing circuits or processors connected via the bus based on a determination result in the determining,
wherein the predetermined packet includes additional information encrypted on a basis of a date and time and model information of the information processing apparatus, and the expected response packet includes information obtained by decrypting the additional information.

8. The method according to claim 7, wherein the response packet is produced by the hardware being connected to the socket.

9. The method according to claim 7, wherein, in the controlling, supplying of the power to the hardware is stopped in a case where the received response packet is not the expected packet.

10. An information processing apparatus, comprising:
a plurality of processing circuits or processors;
a socket that is capable of connecting a hardware, wherein the hardware being connected to the socket and the plurality of processing circuits or processors are connected in series via a bus; and
a power source that supplied power to the plurality of processing circuits or processors and the hardware being connected to the socket,
wherein one of the plurality of processing circuits or processors transmits a predetermined packet to the bus,
upon receiving a response packet to the predetermined packet, the one of the plurality of processing circuits or processors determines whether or not the response packet is an expected response packet, and
the one of the plurality of processing circuits or processors controls supplying power from the power source to the hardware being connected to the socket and the plurality of processing circuits or processors connected via the bus based on a determination result of the response packet,
wherein the predetermined packet includes additional information encrypted on a basis of a date and time and model information of the information processing apparatus, and the expected response packet includes information obtained by decrypting the additional information.

11. The information processing apparatus according to claim 10, wherein the one of the plurality of processing circuits or processor stops supplying the power to the hardware in a case where the received response packet is not the expected packet.

12. The information processing apparatus according to claim 10,
wherein in accordance with a determination that that the response packet is not the expected response packet, the one of the plurality of processing circuits or processor controls the power source to stop supplying the power to the hardware being connected to the socket and the plurality of processing circuits or processors connected via the bus.

13. The information processing apparatus according to claim 10, wherein
the predetermined packet includes a destination for specifying the hardware being connected to the socket and the plurality of processing circuits or processors,
one of the hardware being connected to the socket and the plurality of processing circuits or processors performs processing on a packet that is addressed to the one of the hardware being connected to the socket and the plurality of processing circuits or processors, and
the hardware connected to the socket and the plurality of processing circuits or processors performs processing on a packet that is to be addressed to the one of the hardware being connected to the socket and the plurality of processing circuits or processors.

14. The information processing apparatus according to claim 10, wherein
the plurality of processing circuits or processors include a plurality of circuits connected in series, and
the one of the plurality of processing circuits or processor transmits the predetermined packet including a destination specifying each of the plurality of processing circuits, and receives a response packet to the predetermined packet from the plurality of processing circuits.

15. The information processing apparatus according to claim 10, wherein the socket is connected to a circuit configured to through-output an input signal without change in a case that the hardware is not connected to the socket.

16. The information processing apparatus according to claim 10, wherein the plurality of processing circuits or processors include an application specific integrated circuit (ASIC).

* * * * *